United States Patent
Ying et al.

(10) Patent No.: US 10,501,065 B2
(45) Date of Patent: Dec. 10, 2019

(54) SYSTEM AND METHOD FOR VALIDATING OPERATION OF SECONDARY BRAKING SYSTEM OF A VEHICLE

(71) Applicant: Autoliv ASP, Inc., Ogden, UT (US)

(72) Inventors: Long Ying, Novi, MI (US); Alexandru Versin, Southfield, MI (US); Juchirl Park, Southfield, MI (US)

(73) Assignee: VEONEER NISSIN BRAKE SYSTEMS JAPAN CO. LTD., Ueda-Shi, Nagano-Ken (JP)

( * ) Notice: Subject to any disclaimer, the term of this patent is extended or adjusted under 35 U.S.C. 154(b) by 207 days.

(21) Appl. No.: 15/639,652

(22) Filed: Jun. 30, 2017

(65) Prior Publication Data

US 2019/0001949 A1    Jan. 3, 2019

(51) Int. Cl.
*B60T 17/22* (2006.01)
*B60T 15/04* (2006.01)
(Continued)

(52) U.S. Cl.
CPC .......... *B60T 17/221* (2013.01); *B60T 8/4081* (2013.01); *B60T 8/88* (2013.01); *B60T 8/885* (2013.01); *B60T 15/041* (2013.01); *B60T 7/22* (2013.01); *B60T 8/17* (2013.01); *B60T 8/34* (2013.01); *B60T 8/36* (2013.01); *B60T 8/44* (2013.01);
(Continued)

(58) Field of Classification Search
CPC ... B60T 8/34; B60T 13/20; B60T 8/48; B60T 8/172; B60T 17/221; B60T 8/44; B60T 1/10; B60T 7/04; B60T 13/14; B60T 13/66; B60T 13/68; B60T 8/40; B60T 8/17; B60T 8/175; B60T 8/1755; B60T 8/24; B60T 8/42; B60T 13/58; B60T 8/32; B60T 8/26; B60T 13/10; B60T 8/4081; B60T 8/88; B60T 8/885; B60T 15/041; B60K 31/06; B60K 31/10
See application file for complete search history.

(56) References Cited

U.S. PATENT DOCUMENTS 5,172,961 A * 12/1992 Inoue ...................... B60T 8/175
                                                    303/146
5,328,251 A    7/1994 Brearley
(Continued)

OTHER PUBLICATIONS

International Search Report for related application PCT/US2018/039299, ISA/US, Alexandria, VA, dated Sep. 19, 2018.
(Continued)

*Primary Examiner* — Behrang Badii
(74) *Attorney, Agent, or Firm* — Stephen T. Olson; Harness, Dickey & Pierce, P.L.C.

(57) ABSTRACT

A method is disclosed for validating operation of a secondary braking system (SBS) of a vehicle having a plurality of brakes, by controlling the SBS and a primary braking system (PBS) of the vehicle. The method may involve using the PBS to generate a first predetermined target braking pressure in the PBS for at least a first one of the brakes, while using the SBS to generate a second predetermined target braking pressure in the SBS for at least a second one of the brakes. Actual and anticipated performance characteristics of a braking component associated with the vehicle are then observed and compared, and from the comparison a determination is made whether the SBS is operating properly.

14 Claims, 3 Drawing Sheets

(51) Int. Cl.
   B60T 8/88 (2006.01)
   B60T 8/40 (2006.01)
   B60T 8/34 (2006.01)
   B60T 13/20 (2006.01)
   B60T 8/36 (2006.01)
   B60T 13/68 (2006.01)
   B60T 8/44 (2006.01)
   B60T 7/22 (2006.01)
   B60T 8/17 (2006.01)

(52) U.S. Cl.
   CPC ............... *B60T 13/20* (2013.01); *B60T 13/68* (2013.01); *B60T 2270/402* (2013.01); *B60T 2270/406* (2013.01)

(56) References Cited

U.S. PATENT DOCUMENTS

| | | | | |
|---|---|---|---|---|
| 5,344,224 | A * | 9/1994 | Yasuno | B60T 8/172 303/146 |
| 6,089,677 | A * | 7/2000 | Fukumura | B60K 31/107 303/112 |
| 2002/0166369 | A1 | 11/2002 | Harris et al. | |
| 2003/0038538 | A1 | 2/2003 | Niepelt et al. | |
| 2010/0292889 | A1 | 11/2010 | Cahill et al. | |
| 2011/0241419 | A1 | 10/2011 | Ohkubo et al. | |
| 2012/0235469 | A1 | 9/2012 | Miyazaki et al. | |
| 2013/0304313 | A1 | 11/2013 | Svensson et al. | |
| 2015/0001919 | A1 * | 1/2015 | Murayama | B60T 8/441 303/14 |
| 2015/0210256 | A1 * | 7/2015 | Yamashita | B60T 7/22 303/14 |
| 2015/0291137 | A1 * | 10/2015 | Takeuchi | B60T 8/4072 303/10 |
| 2017/0166180 | A1 | 6/2017 | Chang et al. | |
| 2019/0061719 | A1 * | 2/2019 | Higashi | B60T 8/00 |

OTHER PUBLICATIONS

Written Opinion of the ISA for related application PCT/US2018/039299, ISA/US, Alexandria, VA, dated Sep. 19, 2018.

* cited by examiner

SYSTEM AND METHOD FOR VALIDATING OPERATION OF SECONDARY BRAKING SYSTEM OF A VEHICLE

FIELD

The present disclosure relates to braking system for motor vehicles, and more particularly to a system and method for validating operation of a secondary braking system of a vehicle.

BACKGROUND

The statements in this section merely provide background information related to the present disclosure and may not constitute prior art.

Modern day braking systems used on motor vehicles such as passenger cars and trucks often employ a Primary Brake System ("PBS") and a Secondary Brake System ("SBS") which are hydraulically connected in series. The PBS provides the main means for generating brake pressure to the brake calipers associated with the four wheels of the vehicle. The PBS, does this while constantly monitoring the hydraulic fluid that it applies and the pressure it generates, internal to the PBS itself.

The SBS often forms a portion of an Electronic Stability Control System ("ESC"). The ESC system is able to independently control hydraulic pressure applied to the brake calipers of at least two wheels of the vehicle, often the front right and front left brakes calipers, in response to detected braking conditions (e.g., emergency evasive braking maneuver), with a goal maintaining control of the vehicle. The SBS also forms a backup braking system which is able to hydraulically control the brake fluid applied to at least two brakes of the vehicle in the event that a failure occurs in the PBS.

The growing interest in autonomous vehicles has also added the requirement of a validation mechanism to check that the SBS is functioning normally, even while the PBS is functioning normally, to ensure the redundancy of the overall braking system. Ideally, this validation mechanism should be implemented with minimal additional component parts being introduced into the vehicle's braking system and without unduly complicating operation of the PBS or the SBS. Moreover, the validation mechanism should operate transparently to the user so that a validation check can be automatically performed by the braking system.

SUMMARY

In one aspect the present disclosure relates to a method for validating operation of a secondary braking system (SBS) of a vehicle having a plurality of brakes, by controlling the SBS and a primary braking system (PBS) of the vehicle. The method may comprise using the PBS to generate a first predetermined target braking pressure in the PBS for at least a first one of the brakes. The SBS may be used to generate a second predetermined target braking pressure in the SBS for at least a second one of the brakes, while maintaining the first predetermined target braking pressure in the PBS. The second predetermined target braking pressure may be higher than the first predetermined target braking pressure. The method may also involve observing an actual performance characteristic associated with a braking component of the vehicle, and comparing the actual performance characteristic with an anticipated performance characteristic of the braking component. When the actual performance characteristic is approximately equal to the anticipated performance characteristic, a determination may be made that the SBS is operating properly. When the actual performance characteristic is not approximately equal to the anticipated performance characteristic, a determination may be made that the SBS is not operating properly.

In another aspect the present disclosure relates to a method for validating operation of a secondary braking system (SBS) of a vehicle having a plurality of brakes using a primary braking system (PBS) of the vehicle, where the PBS and SBS are hydraulically arranged in series. The method may comprise controlling a slave cylinder associated within the PBS to cause the PBS to generate and maintain a first predetermined target braking pressure applied to a first pair of brakes of the vehicle. The method may also involve controlling the SBS to generate a second predetermined target braking pressure which is applied to a second pair of brakes of the vehicle, and which his higher than the first predetermined target braking pressure, while the PBS maintains the first predetermined target braking pressure. The method may involve detecting an actual performance characteristic associated with the slave cylinder while the SBS is generating the second predetermined target braking pressure, and then comparing the actual performance characteristic with an anticipated performance characteristic of the slave cylinder. The method may use the comparison of the actual and anticipated performance characteristics to validate proper operation of the SBS.

In still another aspect the present disclosure relates to a system for validating operation of a secondary braking system (SBS) of a vehicle having a plurality of brakes. The system may comprise a primary braking system (PBS) controlled to generate a first predetermined target braking pressure in the PBS for at least a first one of the brakes. The system may control the SBS to generate a second predetermined target braking pressure in the SBS for at least a second one of the brakes, while the PBS maintains the first predetermined target braking pressure in the PBS. The second predetermined target braking pressure may be higher than the first predetermined target braking pressure. The system may also include an electronic subsystem configured to detect an actual performance characteristic associated with a braking component of the vehicle when the second predetermined target braking pressure in the SBS is reached. The electronic subsystem may also be configured to obtain an anticipated performance characteristic associated with the braking component of the vehicle when the second predetermined target braking pressure in the SBS is reached, and then to compare the actual and anticipated performance characteristics. The electronic subsystem may use the comparison to determine whether the SBS is operating properly.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
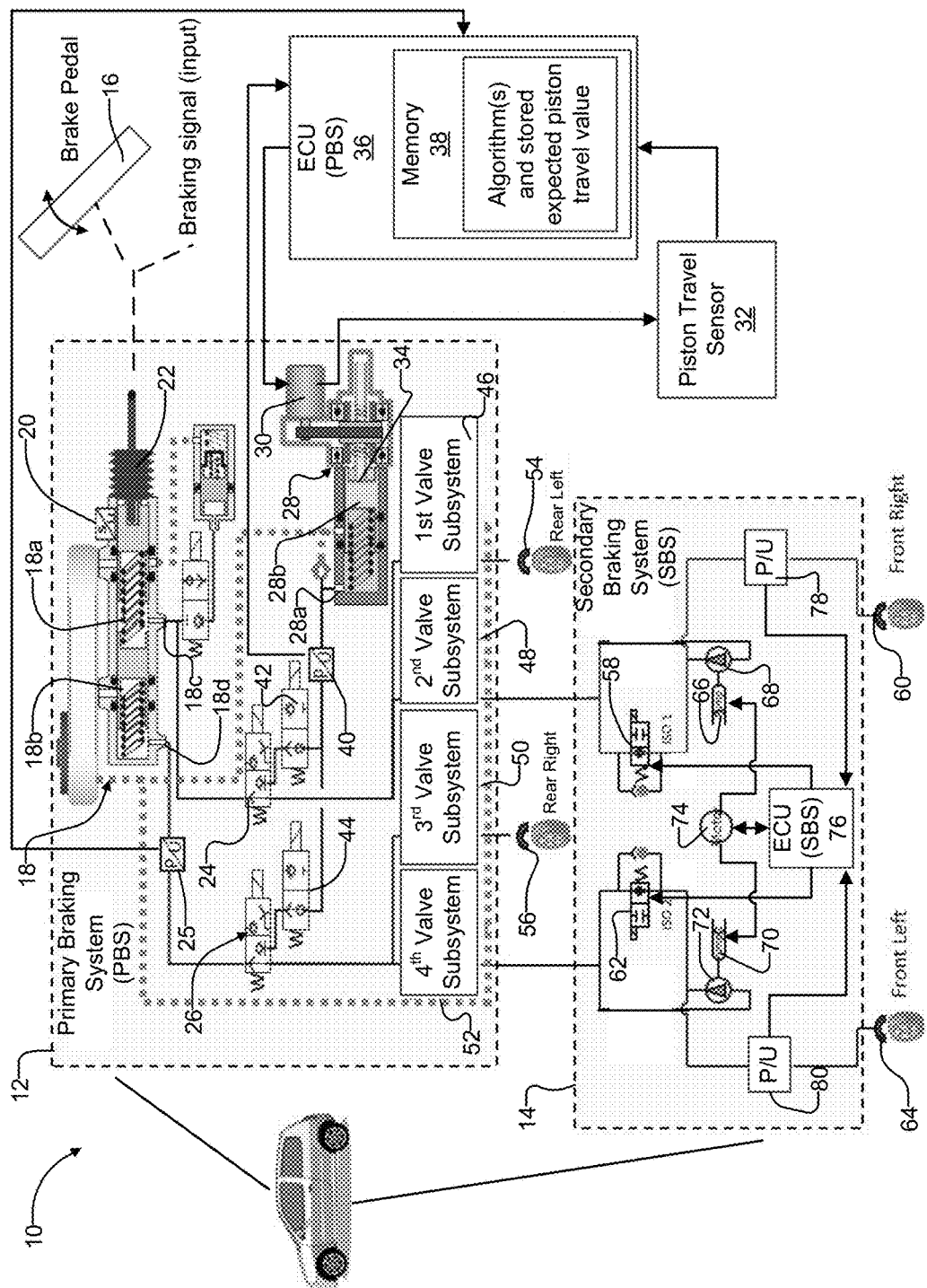
FIG. 1 shows a high level block diagram of one embodiment of a validation system of the present disclosure in which a Secondary Braking System (SBS) is hydraulically connected in series with a Primary Braking System (PBS)

The following description is merely exemplary in nature and is not intended to limit the present disclosure, application, or uses. It should be understood that throughout the drawings, corresponding reference numerals indicate like or corresponding parts and features.

Referring to FIG. 1 there is shown a system 10 in accordance with one embodiment of the present disclosure. The system 10 includes a Primary Braking System ("PBS") 12 and a Secondary Braking System 14 ("SBS") which are connected hydraulically in series.

The PBS 12 may include a brake pedal 16 or other component which provides an input braking signal to a master cylinder 18. The master cylinder includes a stroke sensor 20 for sensing a stroke of the brake pedal 16 (assuming a brake pedal is incorporated). A pedal feel simulator valve ("PFSV") 22 may be in communication with an output port 18c of a primary circuit portion 18a of the master cylinder 18 and also with a primary circuit first master cut valve ("MCV") 24. A secondary circuit portion 18b of the master cylinder 18 may be in communication with a first pressure sensor 25 via an output port 18d, which is in turn in communication with a primary circuit second MCV 26.

The PBS 12 further may include a slave cylinder 28 having a cylinder portion 28b with an output port 28a. An electric motor 30 operably associated with the slave cylinder 28 may be used to drive a slave cylinder piston 34 residing within the cylinder portion 28b linearly in response to commands from an electronic control unit (ECU) 36 of the PBS 12. The slave cylinder 28 is used to help generate fluid pressure in the PBS 12 and the SBS 14. A piston travel sensor 32 may monitor the real time travel of the slave cylinder piston 34 and provide this information to the ECU 36. The ECU 36 may include, or may be in communication with, a non-volatile memory 38 such as a random access memory or a read only memory. The memory 38 may include one or more algorithms used by the ECU 36 for validation testing. The expected slave cylinder piston 34 travel is determined, through testing and calibration procedures, to produce a known quantity of hydraulic brake fluid displacement from the cylinder portion 28b of the slave cylinder 28 when the system 10 is operating properly. This anticipated fluid displacement or "consumption" value may be stored in the memory 38, and correlates closely with the amount of slave cylinder piston 34 travel that occurs when the PBS 12 and the SBS 14 are brought up to specific pressures.

The output port 28a of the slave cylinder 28 may be in communication with a pressure sensor 40, which in turn may be in communication with a first apply valve (APV) 42 and a second APV 44. The first and second APVs 42 and 44 may be in communication with MCVs 24 and 26, respectively. In this manner fluid pressure generated by the slave cylinder 28 can be used to help pressurize both the PBS 12 and the SBS 14.

The first MCV 24 may be in communication with first and second valve subsystems 46 and 48, respectively. The second MCV 26 may be in communication with third and fourth valve subsystems 50 and 52, respectively. First valve subsystem 46 in this example controls the flow of hydraulic fluid flow to the rear left brake caliper 54, while third valve subsystem 50 controls the hydraulic fluid flow to a rear right brake caliper 56. Second valve subsystem 48 communicates with a first isolation ("ISO") valve 58 of the SBS 14, which in this example helps to control the hydraulic flow to a front right brake caliper 60. The fourth valve subsystem 52 communicates with a second ISO valve 62 of the SBS 14, which in this example helps to control hydraulic fluid flow to a front left brake caliper 64.

In addition to the first and second ISO valves 58 and 62, the SBS 14 may also include a first pump 66 and a one-way valve 68, which enable communication of the first pump with the second valve subsystem 48 and also with the front right brake caliper 60. A second pump 70 and a one-way valve 72 may be included which communicate with the fourth valve subsystem 52 and also with the front left brake caliper 64. The SBS 14 may also include a motor 74 which is controlled by an electronic control unit (ECU) 76 to help raise the hydraulic fluid braking pressure in the SBS 14 when performing a validation check, as will be described in greater detail in the following paragraphs.

The isolation valves 58 and 62 may be used to disable excessive fluid communication from the wheel cylinders associated with the front right and front left brake calipers 60 and 64 back to the slave cylinder 28 and the master cylinder 18. Optional pressure sensors 78 and 80 may also be included to directly sense the hydraulic fluid pressure being applied to each of the front right and front left brake calipers 60 and 64, respectively.

The construction and operation of the PBS 12 described above is generally known in the art. The PBS 12 in this example is used to control the application of hydraulic braking fluid to all four brake calipers 54, 56, 60 and 64 during normal braking action. The SBS 14 only needs to be used if a failure within the PBS 12 occurs. It is therefore important that proper functioning of the SBS 14 is verified, for example periodically as required or needed, to ensure the redundancy of the system 10. This is especially so if the system 10 is being used in an autonomous vehicle.

To implement the SBS validation feature that the system 10 provides, during initial testing and calibration of the system 10 a determination may be made as to a "home" or "zero" position of the piston 34 when no braking pressure is being applied. Alternatively, a first quantity of hydraulic fluid that will be displaced from the cylinder portion 28b of the slave cylinder 28 when the PBS 12 builds braking pressure to a first target braking pressure in the PBS 12 may be determined. Either method may be used to provide a "home" or "zero" or "reference" position against which further piston travel 34 or further fluid displacement may be compared. If a first quantity of displaced hydraulic fluid is used as a reference, then this quantity of hydraulic fluid displacement will also correspond to the amount of piston 34 travel in the slave cylinder 28. Similarly, during testing and calibration it may be determined what quantity of fluid is displaced from the cylinder portion 28b of the slave cylinder 28 by piston 34 travel when the second predetermined braking pressure is reached in the SBS 14, and these values may be saved in any suitable non-volatile memory (e.g., ECU memory 38). Therefore, during testing and calibration of the system 10, the relationship between the total quantity of fluid displaced when each of the first and second target braking pressures is reached, and the travel of the piston 34, is analyzed and saved. The first predetermined target braking pressure may be sensed using the pressure sensor 40 on the output side of the slave cylinder 28. These variables (i.e., volume of hydraulic fluid displaced and optionally the piston 34 travel) may be stored in the memory 38 or in any memory component that is accessible to the SBS ECU 72 and/or the PBS ECU 36. The system 10 thus "knows" that to produce the first predetermined target braking pressure, a first amount of piston 34 travel and a first quantity of fluid displacement from the slave cylinder 28 will occur, and to produce the second predetermined target braking pressure a known, second amount of fluid displacement will occur, along with a second amount of piston 34 travel (i.e., greater than the first). The known, second amount of fluid displacement may be termed the "anticipated" fluid consumption or displacement.

Figure 2:
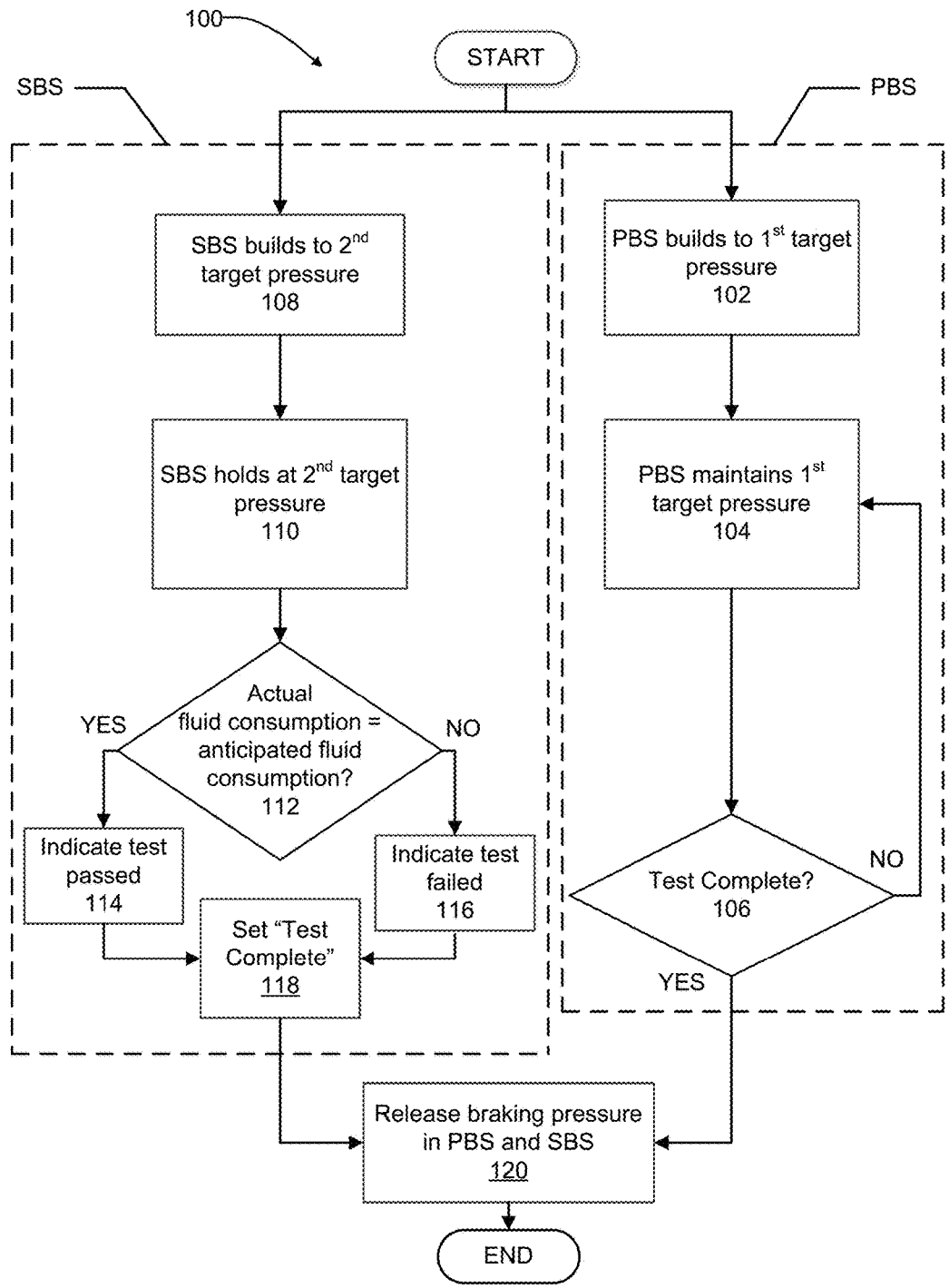
FIG. 2 is a high level flowchart illustrating a plurality of operations that may be performed in parallel by the PBS and the SBS during an SBS validation test.

Referring to FIG. 2, a flowchart 100 is shown setting forth a plurality of operations that may be performed by the system 10 when performing an SBS validation routine. Operations 102 through 106 are performed by the PBS 12 in parallel with operations 108-118, which are performed by the SBS 14. At operation 102 the PBS 12 builds to the first target braking pressure. At operation 104 the PBS 12 maintains the first target braking pressure. At operation 106 the PBS 12 checks to see if a message "Test Complete" has been received from the SBS 14. If not, operations 104 and 106 are repeated. If the check at operation 106 produces a "Yes" answer, then braking pressure is released by the PBS 12 at operation 120.

Simultaneously with the above described operations, the SBS 14, at operation 102, builds braking pressure in the SBS up to the second target braking pressure. At operation 110 the SBS 14 holds at the second target braking pressure. At operation 112 the SBS 14 makes a check if actual fluid consumption equals the anticipated fluid consumption. If it does not, then at operation 116 the SBS 14 indicates that the test has failed, and generates a "Test Complete" message at operation 118. This "Test Complete" message may be sent to the PBS 12, and both of the PBS 12 and SBS 14 may then release their generated braking pressures, as indicated at operation 120. If the check at operation 112 provides a "Yes" answer, then the SBS 14 may provide an indication that the test has passed, at indicated at operation 114, and then generate a "Test Complete" message at operation 118. The "Test Complete" message may be sent to the PBS 12, which will produce a "Yes" answer at operation 106, resulting in the PBS releasing braking pressure along with the SBS releasing braking pressure.

Figure 3:
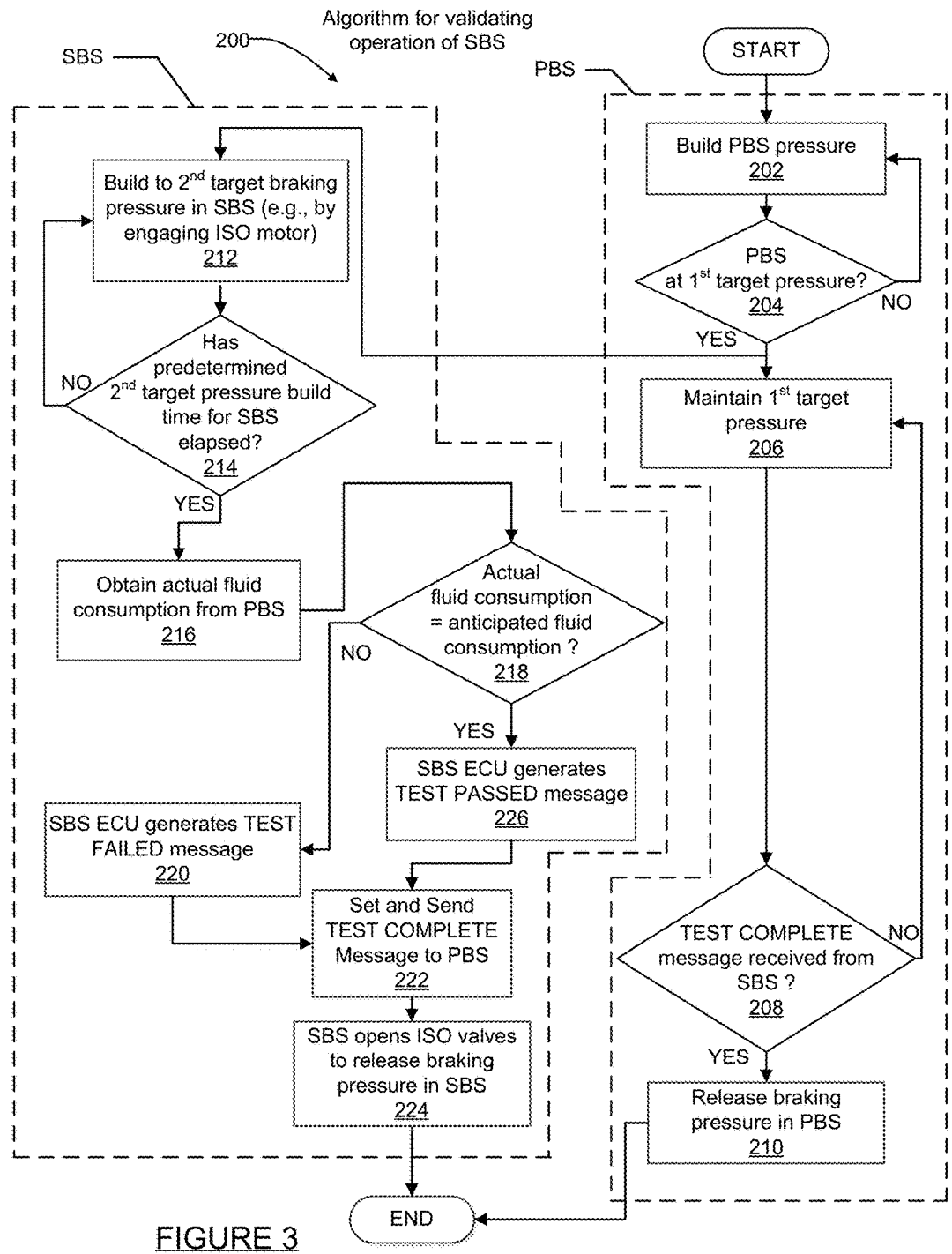
FIG. 3 is a more detailed flowchart illustrating a plurality of operations that the system of FIG. 1 may perform in validating operation of the SBS.

Referring to FIG. 3, a more detailed flowchart 200 is shown which sets forth in greater detail various operations that may be performed by the system 10 in implementing an SBS validation routine. At operation 202 the PBS ECU 36 causes a pressure build toward the first predetermined target braking pressure. This involves the PBS ECU 36 controlling the slave cylinder 28 to generate the first predetermined target braking pressure, which may be stored in the memory 38 for recall by the PBS ECU 36. Thus, the first predetermined target braking pressure will be a preset pressure that is programmed into the memory 38 during calibration of the system 10. At operation 204 the PBS ECU 36 checks to determine if the first predetermined target braking pressure has been reached. If not, operation 202 is repeated. If so, at operation 206 the PBS ECU 36 maintains the first predetermined target braking pressure. At operation 208 the PBS ECU 36 checks if a message or signal has been received, for example from the SBS 14 ECU 76, that the SBS validation test is complete. If no such signal or message has been received, then the first target braking pressure is maintained in the PBS 12. If the check at operation 208 indicates that the SBS validation check is complete, then the PBS ECU 36 releases the braking pressure in the PBS 12 as indicated at operation 210.

It will be appreciated that operations 202-210 are performed in parallel with operations performed by the SBS ECU 76 during the SBS validation check. So while the PBS ECU 36 is controlling the pressure in the PBS 12, the SBS ECU 76 will be executing operations 212-226 in FIG. 3. At operation 212 the SBS ECU 76 initially causes pressure in the SBS 14 to build toward the second predetermined target braking pressure. This may be accomplished by controlling motor 74 to drive pumps 66 and 70 to increase the fluid pressure being applied to the front right caliper 60 and the front left caliper 64.

At operation 114 the SBS ECU 76 may check to determine if a predetermined pressure build time for reaching the second predetermined target braking pressure has elapsed. If not, then the SBS ECU 76 continues controlling the pumps 66 and 70 to build pressure in the SBS 14. When the check at operation 214 indicates that the second predetermined target braking pressure build time has elapsed, the SBS ECU 76 may obtain the actual fluid consumption value from the PBS ECU 36, or alternatively may obtain the actual piston 34 travel that has resulted in the slave cylinder 28, and from this value may extrapolate (e.g., by using a stored lookup table of piston travel/fluid consumption) the actual fluid consumption. A check may then be made at operation 218 if the actual fluid consumption equals the anticipated fluid consumption value. If it does not, then at operation 220 the SBS ECU 76 may generate a "Test Failed" message which is sent to the PBS ECU 36. The SBS ECU 76 may then generate a "Test Complete" message which is also sent to the PBS ECU 36, as indicated at operation 222. At operation 224, the SBS ECU 76 may then open the two ISO valves 58 and 62 to release any braking pressure that was developed in the SBS 14 during the SBS validation test. When the PBS 12 receives the "Test Complete" message at operation 208, the PBS ECU 36 will release the braking pressure in the PBS 12 as indicated at operation 210. The SBS validation testing will then be complete and the PBS ECU 36 will know that the test has failed. The PBS ECU 36 (or alternatively the SBS ECU 76) may be programmed to take further action, such as providing a visual warning to the vehicle operator, preventing continued operation of the vehicle, etc.

If the check at operation 218 reveals that the actual fluid consumption measured/determined equals the anticipated fluid consumption value, then the SBS ECU 76 may generate a "Test Passed" message, as indicated at operation 226, and the "Test Passed" message may be passed to the PBS ECU 36. Operations 222 and 224 may then be repeated. In this instance the PBS ECU 36 will know that the SBS validation test is complete and that the test has passed, and may then permit full operation of the vehicle.

While the above description references the SBS ECU 76 as the component being used to make the comparison between the expected and actual fluid consumptions, it will be appreciated that this determination could also be performed by the PBS ECU 36, or any other suitable electronic component of the vehicle's electronics system. The SBS ECU 76 may also optionally be provided with a memory which has the stored expected fluid consumption value and/or any algorithms needed to evaluate the actual and anticipated fluid consumption values obtained during the SBS validation test.

The system 10 and method of the present disclosure thus provides a means to quickly validate the operation of the SBS 14 without the need for numerous additional components to be included in the PBS 12 or the SBS 14. While optional pressure sensors 78 and 80 have been shown in FIG. 1 as being a part of the SBS 14, these sensors are not required to carry out the validation test. However, they may be helpful in some instances to provide a further verification that the second predetermined target braking pressure has been reached in the SBS 14 during the SBS validation test. Still further, the SBS 14 could be controlled so that during the validation testing it brings braking pressure up to the second target braking pressure one wheel at a time, rather than bringing up pressure to both wheels (i.e., to calipers 60 and 64) simultaneously.

The system 10 and method of the present disclosure also provides the significant advantage of being easily retrofitted into existing vehicles that include an SBS which is controlled by an electronic stability control system. In most implementations, this retrofitting may be accomplished without the need to make any hardware modifications to the SBS 14.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for validating operation of a secondary braking system (SBS) of a vehicle having a plurality of brakes, by controlling the SBS and a primary braking system (PBS) of the vehicle, the method comprising:
   using the PBS to generate a first predetermined target braking pressure in the PBS for at least a first one of the brakes;
   using the SBS to generate a second predetermined target braking pressure in the SBS for at least a second one of the brakes, while maintaining the first predetermined target braking pressure in the PBS, the second predetermined target braking pressure being higher than the first predetermined target braking pressure;
   observing an actual performance characteristic associated with a braking component of the vehicle;
   comparing the actual performance characteristic with an anticipated performance characteristic of the braking component; and
   when the actual performance characteristic is approximately equal to the anticipated performance characteristic, determining that the SBS is operating properly, and when the actual performance characteristic is not approximately equal to the anticipated performance characteristic, determining that the SBS is not operating properly.

2. The method of claim 1, wherein comparing the actual performance characteristic with an anticipated performance characteristic comprises comparing the actual performance characteristic with a known, predetermined performance characteristic, wherein the known, predetermined performance characteristic is determined during testing and/or calibration of the PBS and SBS systems.

3. The method of claim 2, wherein the known, predetermined performance characteristic is a predetermined amount of hydraulic braking fluid displaced from a slave cylinder of the PBS when the second predetermined target braking pressure is reached.

4. The method of claim 1, wherein determining an actual performance characteristic comprises determining an actual amount of hydraulic braking fluid that is displaced from a braking component of the PBS when the second predetermined target braking pressure is reached in the SBS.

5. The method of claim 4, wherein the braking component is a slave cylinder of the PBS.

6. The method of claim 1, wherein the actual performance characteristic and the anticipated performance characteristic are obtained by monitoring a travel of a piston of a slave cylinder of the PBS.

7. The method of claim 1, wherein using the SBS to generate a second predetermined target braking pressure comprises using an electronic control unit (ECU) of the SBS to control operation of the SBS to achieve the second predetermined target braking pressure.

8. The method of claim 1, wherein using the PBS to generate a first predetermined target braking pressure comprises using an electronic control unit (ECU) of the PBS to achieve the first predetermined target braking pressure.

9. The method of claim 1, wherein using the SBS to generate a second predetermined target braking pressure comprises using at least one isolation valve in the SBS to help control fluid flow leaving the second one of the brakes.

10. The method of claim 9, wherein using the SBS to generate a second predetermined target braking pressure comprises:
    using a motor in the SBS to drive a pump in the SBS, the pump operating to help build fluid pressure in a fluid line associated with the second one of the brakes; and
    using an electronic control unit (ECU) in the SBS to control operation of the motor.

11. The method of claim 1, wherein using the SBS to generate a second predetermined target braking pressure for at least one of the brakes while maintaining the first predetermined target braking pressure in the PBS, comprises using a pair of isolation valves of the SBS, with the pair of isolation valves being associated with the second one of the brakes and a third one of the brakes.

12. The method of claim 1, wherein the anticipated performance characteristic is stored in a memory associated with an electronic control unit (ECU), and where the ECU forms a portion of at least one of the PBS or the SBS.

13. The method of claim 1, further comprising using a pressure sensor operably associated with the PBS to sense the first predetermined target braking pressure developed in the PBS.

14. The method of claim 1, wherein:
    the PBS monitors and controls the first predetermined braking pressure;
    the SBS monitors and controls the second predetermined braking pressure; and
    wherein the PBS and SBS operate in parallel.

* * * * *